3,218,548
NULL-BALANCE BRIDGE CIRCUIT WITH
DIODE GATING MEANS
Cecil A. Crafts, Tustin, Perry H. Goodwin, Jr., Corona del Mar, and Allan Wayne Meyer, Fullerton, Calif., assignors to Robertshaw Controls Company, a corporation of Delaware
Filed Apr. 29, 1960, Ser. No. 25,608
7 Claims. (Cl. 324—57)

The invention presented herein relates to the circuit connected to the output of a null-balance bridge circuit using an alternating current input signal and more particularly to such a circuit which utilizes asymmetrically conducting devices.

Known circuits of this type commonly employ a single-phase bridge-type rectifier connected to the output of the bridge to provide a unidirectional current to an indicator such as a meter or recorder. Each arm of the rectifier includes an asymmetrically conducting device, such as a selenium rectifier or silicon diode. Circuits of this type, however, contribute to non-linear operation of the indicator due to the threshold effect and non-linear response of the rectifier devices.

In addition, an ambiguity can arise near the point where the bridge is balanced. Thus, consider a null-balance bridge circuit in which two arms of the bridge are formed from the secondary winding of a transformer and two caapcitances connected in series across the secondary winding form the other two arms of the bridge. An alternating current input signal is applied to the primary of the transformer and the output signal is taken between a point intermediate the ends of the secondary winding and the common connection of the capacitances. The indicator connected to respond to the output of the bridge can be an alternating current meter or a direct current meter used with a single-phase bridge-type rectifier. One of the capacitances is variable and is adjustable to a value which places the bridge in balance. With the variable capacitance at some value on the high side of bridge balance and decreasing, the bridge output decreases and the meter reading approaches zero. However, as the capacitance is decreased further, a zero point is reached. The output of the bridge then increases in magnitude as the variable capacitance is decreased still further. However, the phase of the output of the bridge changes 180° as the bridge passes through the zero point. The meter reading will thus decrease to zero and will then increase as the variable capacitance is varied from a value on one side of the zero or null point to a value on the other side of the null point. The particular reading of the instrument will not indicate whether the variable capacitance is operating below or above the null or zero point.

It is an object of the invention presented herein, therefore, to provide a circuit for connection to the output terminals of an alternating current null-balance bridge which provides current flow to an indicator in one direction when the variable impedance of the bridge is above its value for bridge balance and a current in the opposite direction when the variable impedance of the bridge is below the value for bridge balance.

Another object of the invention presented herein is to provide a detector circuit for connection to the output of an alternating current null-balance bridge which uses asymmetrically conducting devices in such a manner that the response of the indicator in the detection circuit is not adversely affected by the threshold effect or non-linear response of the asymmetrically conducting devices.

In accordance with a particular form of the invention, the output circuit for a null-balance bridge using an alternating current input includes a phase discriminator connected in series with an indicator. The phase discriminator uses a voltage signal which is in phase with the input signal to the bridge and asymmetrically conducting devices to control the flow of current through the indicator. Current is permitted to flow in one direction through the indicator when the variable impedance has a value corresponding to one side of the null point of the bridge and to permit a current to flow in the opposite direction through the indicator when the variable impedance has a value corresponding to the other side of the null point of the bridge. The voltage signal used by the phase discriminator also controls the operating point for the asymmetrically conducting devices.

The nature of the invention and its various features, objects and advantages will appear more fully on consideration of the embodiment illustrated in the accompanying drawings wherein.

Figure 1:
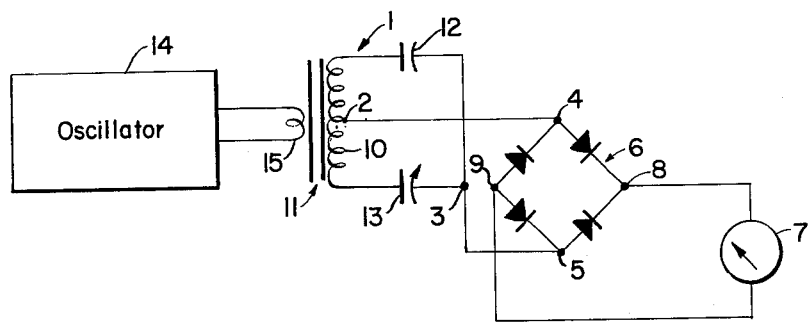
FIG. 1 shows a circuit to illustrate the prior art.

Referring now to the drawings, FIG. 1 is a schematic circuit diagram of a bridge circuit representative of the prior art. An alternating current null-balance bridge 1 has its output terminals 2, 3 connected to the input terminals 4, 5 of a conventional single-phase bridge rectifier 6. An indicator 7, for example, a meter or recorder, is connected to the output terminals 8, 9 of the bridge rectifier 6. The secondary winding 10 of a transformer 11 forms two arms of the bridge. A capacitance 12 connected in series with a variable capacitance 13 and the combination connected in parallel with the secondary winding 10 forms the other two arms of the bridge circuit 1. The output terminal 2 is intermediate the ends of the secondary winding 10, while output terminal 3 is at a point intermediate the capacitances 12 and 13. The input signal, which may be obtained from an electrical oscillator 14, is applied to the bridge circuit 1 via the primary winding 15 of the transformer 11.

By using the bridge rectifier 6, any signal appearing at the output terminals 2 and 3 of the bridge 1 will result in a flow of current from the output terminal 8 of the bridge rectifier 6 through the indicator 7 and thence to the other output terminal 9. An output signal will be present at the output terminals 2 and 3 of the bridge 1 when the variable capacitance 13 has a value above or below its value corresponding to bridge balance. In some applications of a null-balance bridge, it is desirable that it be known whether the value of the variable arm is on the high side of the bridge balance point or on the low side. It is further desirable that this be determined by the indicator 7. In the circuit shown in FIG. 1, this is not possible since any current applied to the indicator 7 is always in the same direction. The same is true if an alternating current type meter were connected directly to the output terminals 2, 3 of the bridge circuit 1.

It should also be noted that the operating point for the diodes used in the bridge rectifier 6 is determined solely by the degree of bridge unbalance. This causes the diodes to operate in the non-linear portion of the operating curve and subjects the circuit to the threshold effects of the diodes, each factor contributing to non-linear operation of the indicator 7.

Figure 2:
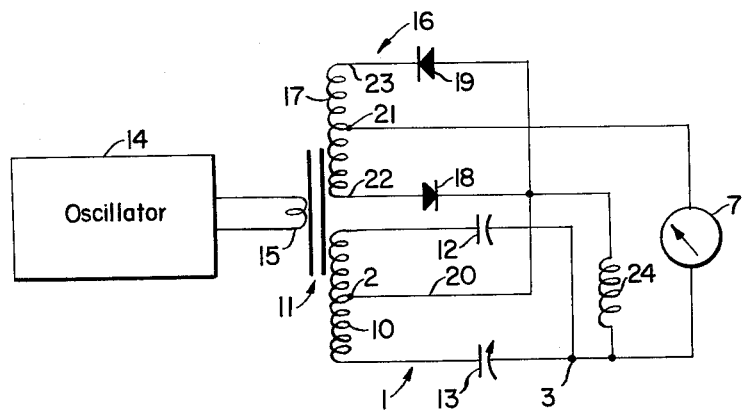
FIG. 2 is a schematic diagram showng a bridge circuit embodying the invention.

FIG. 2 is a schematic circuit diagram of a bridge circuit embodying the invention. As in FIG. 1, an alternating current null-balance bridge of the inductance-capacitance type is shown. This is merely for purposes of illustration and it should be understood that the output circuit to be described can be used with any alternating current null-balance bridge. Since portions of FIG. 2 are the same as those in FIG. 1, the same reference numerals will be employed in FIG. 2 as in FIG. 1 wherever applicable.

In FIG. 2, a series circuit including the indicator 7 and a phase discriminator 16 is connected to the output terminals 2, 3 of bridge 1. The transformer 11 has an additional secondary winding 17 which forms a part of phase discriminator 16. Two asymmetrically conducting devices 18, 19, which may be silicon diodes, are connected in series across the winding 17. The diodes 18, 19 are poled in the same direction, that is, they are connected so that the cathode of one diode is connected to one end of winding 17 and the anode of the other diode is connected to the other end of winding 17. The output terminal 2 of the bridge circuit 1 is connected via a conductor 20 to a point intermediate the diodes 18, 19. The indicator 7 is connected to a center tap 21 provided on winding 17.

The phase discriminator 16 has the form of a bridge circuit with the center tap 21 of winding 17 and the connection common to the diodes 18, 19 providing the output terminals. This forms a balanced bridge so there will be no voltage difference existing between the output terminals of the phase discriminator due to the voltage induced in winding 17. Therefore, the voltage induced in winding 17 does not add to or subtract from any current flowing through indicator 7 due to unbalance of bridge 1.

However, current will flow through diodes 18, 19 for one-half of each cycle of the alternating current induced in winding 17. Thus, when the end 22 of winding 17 is positive with respect to the other end 23, current will flow via diode 18 adjacent end 22 and diode 19 connected to the other end 23 of winding 17. During the other half of each cycle of alternating current, end 22 of winding 17 is negative with respect to the other end 23 so no current will flow in the phase discriminator circuit because of the high impedance presented by diodes 18 and 19.

The phase of the voltage appearing between the output terminals 2, 3 of the bridge changes 180° as the bridge passes through the null-balance point. The voltage output of the bridge 1 is developed across an inductance 24 connected between the output terminals 2 and 3. The inductor 24 provides a path for the D.C. current that passes through the indicator 7. Thus assuming the polarity of the end 22 of winding 17 to be positive with respect to the other end 23 of winding 17 at a given instant of time, the polarity of terminal 2 with respect to terminal 3 will be positive or negative at the same instant of time, dependent on the value of capacitance 13 relative to its value corresponding to bridge balance.

Considering the case of bridge unbalance where terminal 2 is negative with respect to the terminal 3 and the end 22 of winding 17 is positive with respect to the other end 23, the flow of current will be from terminal 3, thence via the indicator 7 to the center tap 21, thence via winding 17 to end 22 and then to inductance 24 via diode 18. The current flow from center tap 21 is in the direction described since the polarity of the voltage between the center tap 21 and end 22 aids the flow of current, while the voltage between center tap 21 and end 23 of winding 17 opposes any flow of current from center tap 21 to end 23. In addition, the diode 19 presents a high impedance to current flow in the direction from center tap 21 to end 23. This condition continues for one-half of a cycle of the alternating current signal obtained from the electrical oscillator 14. It is also during this half cycle that diode 18 is passing current due to the voltage across winding 17. The operating point for diode 18 is thus determined by the voltage induced in winding 17 by the signal applied to the primary winding 15.

During the next half cycle of the alternating current, the output terminal 2 of bridge 1 is positive with respect to the output terminal 3 and end 22 of winding 17 is negative with respect to the other end 23. The voltage between end 23 of winding 17 and center tap 21 opposes any flow of current from terminal 3 via diode 19. In addition, diode 18 presents a high impedance to any current flow from terminal 2 to end 22 of winding 17. Thus, for one condition of unbalance for bridge 1, current flow through indicator 7 is from terminal 3 to terminal 2 via phase discriminator 16.

For the other condition of unbalance for bridge 1, terminal 2 is positive with respect to terminal 3 when end 22 of winding 17 is positive with respect to the other end 23. This is the case for one-half of each cycle of the alternating current. During the other half of each cycle, terminal 2 is negative with respect to terminal 3 and end 22 of winding 17 is negative with respect to the other end 23. In this case, current will flow for one-half of each cycle through indicator 7, but in the direction from terminal 2 to terminal 3 via phase discriminator 16. Diode 19 then carries the current which flows through indicator 7 and like diode 18 has its operating point determined by the voltage induced in winding 17.

Thus, the current flow through indicator 7 is in one direction when the value of capacitance 13 is above its value for bridge balance and in the opposite direction when the value of capacitance 13 is below its value for bridge balance. The indicator 7 can thus supply information as to the value of capacitance 13 relative to its value at bridge balance. In addition, though asymmetrically conducting devices are used in the phase discriminator 16, they do not contribute to non-linear operation of the indicator 7 as is the case in the prior art circuits, such as shown in FIG. 1, since it is possible to select the point of operation for the asymmetrically conducting devices.

Many modifications may be made in this invention without departing from the spirit of the invention as exemplified in the above described embodiment and defined in the appended claims.

We claim:

1. A circuit for connection to the output terminals of a null-balance bridge circuit using an alternating current input signal comprising an indicator for connection to one output terminal of said null-balance bridge; a circuit portion including an electrical winding, circuit means connected in series with said electrical winding and having means limiting the flow of current in said circuit means to one direction, a first connecting point for connecting said circuit portion to the other output terminal of said null-balance bridge, a second connecting point for connecting said circuit portion to said indicator, one of said connecting points being intermediate the ends of said electrical winding and the other of said connecting points being intermediate the ends of said circuit means, said connecting points being electrically the same with respect to a voltage difference across said electrical winding; and means for inducing a voltage in said electrical winding having the same phase and frequency as said alternating current input signal.

2. A circuit for connection to the output terminals of a null-balance bridge circuit using an alternating current input signal comprising an indicator for connection to one output terminal of said null-balance bridge; a circuit portion including an electrical winding, a circuit having two series connected asymmetrically conducting devices connected in series with said electrical winding, said devices being poled in the same direction, a first connecting point for connecting said circuit portion to the other terminal of said null-balance bridge, a second connecting point for connecting said circuit portion to said indicator, one of said connecting points being intermediate the ends of said electrical winding and the other of said connecting points being intermediate said asymmetrically conducting devices, said connecting points being electrically the same with respect to a voltage difference across said electrical winding; and means for inducing a voltage in said electrical winding having the same phase and frequency as said alternating curent input signal last said means providing a biasing voltage for said asymmetrically conducting devices during a portion of each cycle.

3. A measuring device including an electrical oscillator having an alternating current output; a first circuit portion including a first electrical winding, a first and second electrical impedance, means connecting said first and second electrical impedances in series, said series connected impedances being connected in series with said first electrical winding, two connecting points, one connecting point being intermediate the ends of said first electrical winding and the other connecting point being intermediate said first and second electrical impedances; a second circuit portion including a second electrical winding, circuit means connected in parallel with said second electrical winding and having means limiting the flow of current in said circuit means to one direction, two connecting points, one of said connecting points being intermediate the ends of said second electrical winding and the other of said connecting points being intermediate the ends of said circuit means, said connecting points being electrically the same with respect to a voltage difference across said second electrical winding; means connecting one of said connecting points of said first circuit portion to one of said connecting points of said second circuit portion; an indicator; means connecting said indicator to the other of said connecting points of said first circuit portion; means connecting said indicator to the other of said connecting points of said second circuit portion; and means inductively coupling the output of said electrical oscillator to said first and second electrical windings.

4. A measuring device including an electrical oscillator having an alternating current output; a first circuit portion including a first electrical winding, a first and second electrical impedance, means connecting said first and second electrical impedances in series, said series connected impedances being connected in series with said first electrical winding, two connecting points, one of said connecting points being intermediate the ends of said first electrical winding and the other of said connecting points being intermediate said first and second electrical impedances; a second circuit portion including a second electrical winding, a circuit having two series connected asymmetrically conducting devices connected in parallel with said second electrical winding, said devices being poled in the same direction, two connecting points, one of said connecting points being intermediate the ends of said second electrical winding and the other of said connecting points being intermediate said devices, said connecting points of said second circuit portion being electrically the same with respect to a voltage difference across said second electrical winding; means connecting one of said connecting points of said first circuit portion to one of said connecting points of said second circuit portion; an indicator; means connecting said indicator to the other of said connecting points of said first circuit portion; means connecting said indicator to the other of said connecting points of said second circuit portion; and means inductively coupling the output of said electrical oscillator to said first and second electrical windings.

5. A null-balance bridge circuit using an alternating curent input signal comprising a transformer having a primary winding to which the alternating current input signal is applied and first and second secondary windings; a first circuit portion including said first secondary winding, a first and second electrical impedance, means connecting said first and second electrical impedances in series, and series connected impedances being connected in series with said first secondary winding, two connecting points, one of said connecting points being intermediate the ends of said first secondary winding and the other of said connecting points being intermediate said first and second electrical impedances; a second circuit portion including said second secondary winding, circuit means connected in series with said second secondary winding and having means limiting the flow of current in said circuit means to one direction, two connecting points, one of said connecting points being intermediate the ends of said second secondary winding and the other of said connecting points being intermediate the ends of said circuit means, said connecting points of said second circuit portion being electrically the same with respect to a voltage difference across said second secondary winding; means connecting one of said connecting points of said first circuit portion to one of said connecting points of said second circuit portion; an indicator; means connecting said indicator to the other of said connecting points of said first circuit portion and means connecting said indicator to the other of said connecting points of said second circuit portion.

6. A null-balance bridge circuit using an alternating current input signal comprising a transformer having a primary winding to which the alternating current input signal is applied and first and second secondary windings; a first circuit portion including said first secondary winding, a first and second electrical impedance, means connecting said first and second electrical impedances in series, said series connected impedances being connected in series with said first secondary winding, two connecting points, one of said connecting points being intermediate the ends of said first secondary winding and the other of said connecting points being intermediate said first and second electrical impedances; a second circuit portion including said second secondary winding, a circuit having two series connected asymmetrically conducting devices connected in series with said second secondary winding, said devices being poled in the same direction, two connecting points, one of said connecting points being intermediate the ends of said second secondary winding and the other of said connecting points being intermediate said devices, said connecting points of said second circuit portion being electrically the same with respect to a voltage difference across said second secondary winding; means connecting one of said connecting points of said first circuit portion to one of said connecting points of said second circuit portion; an indicator; means connecting said indicator to the other of said connecting points of said first circuit portion and means connecting said indicator to the other of said connecting points of said second circuit portion.

7. A null-balance bridge circuit comprising a first transformer winding arranged for alternating current energization, second and third windings coupled to respond to said energization, each having end and intermediate output terminals, a junctioned pair of impedance elements series connected to said second winding forming third and fourth arms of a null-balance bridge of which said second winding forms first and second arms and having terminals for output therefrom at said second winding intermediate terminal and at the junction of said impedances, a pair of asymmetrical conductors series connected in like polarity to said third winding to form a unidirectional current bridge having gated output terminals at said intermediate terminal thereof and at a junction of said asymmetrical conductors, first means connecting one said output terminal of one said bridge to a said output terminal of the other said bridge, second means connecting together the other output terminals of said bridges and null-balance indicator means connected in series with one said connecting means.

References Cited by the Examiner
UNITED STATES PATENTS

| | | | |
|---|---|---|---|
| 2,505,072 | 4/1950 | Sunstein | 324—57 |
| 2,562,912 | 8/1951 | Hawley | 324—87 |
| 2,880,390 | 3/1959 | Calvert | 324—61 |
| 2,919,404 | 12/1959 | Rock | 324—83 |
| 2,934,699 | 4/1960 | Offner | 324—57 |

FOREIGN PATENTS 723,931  8/1942  Germany.

OTHER REFERENCES

Schafer: "Phase-Selective Detectors," Electronics, pages 188–190, 192, February 1954.

WALTER L. CARLSON, *Primary Examiner.*

LLOYD McCOLLUM, SAMUEL BERNSTEIN,
*Examiners.*